United States Patent [19]

Cheng et al.

[11] Patent Number: 4,762,674
[45] Date of Patent: Aug. 9, 1988

[54] BRAZING SLEEVE HAVING CERAMIC FLUX BAND AND METHOD FOR APPLYING SAME

[75] Inventors: Wenche W. Cheng, Monroeville; Donald R. Stoner, Murrysville; Harold T. Keller, deceased, late of Pittsburgh, all of Pa., by Patricia A. Keller, Administratrix

[73] Assignee: Westinghouse Electric Corp., Pittsburgh, Pa.

[21] Appl. No.: 797,348

[22] Filed: Nov. 12, 1985

Related U.S. Application Data

[62] Division of Ser. No. 686,941, Dec. 27, 1984, Pat. No. 4,624,866.

[51] Int. Cl.$^4$ .............................................. G21C 15/00
[52] U.S. Cl. ..................................... 376/405; 228/119
[58] Field of Search .................. 228/119, 223; 148/26; 376/405

[56] References Cited

U.S. PATENT DOCUMENTS

| | | | |
|---|---|---|---|
| 1,734,932 | 11/1929 | Weed | 228/56.3 X |
| 2,897,106 | 7/1959 | Morrison, Jr. | |
| 2,907,299 | 10/1959 | Weiner | |
| 3,025,596 | 3/1962 | Ward et al. | |
| 3,471,310 | 10/1969 | Joseph | |
| 3,619,233 | 11/1971 | Hipp | 427/190 |
| 3,703,254 | 11/1972 | Maierson et al. | 228/56.3 X |
| 3,724,062 | 4/1973 | Cantrell | 228/119 |
| 3,880,113 | 4/1975 | Mueller et al. | |
| 3,962,767 | 6/1976 | Byerly et al. | 228/119 |
| 4,051,809 | 10/1977 | Zickar et al. | |
| 4,122,798 | 10/1978 | Gibson | |
| 4,312,896 | 1/1982 | Armstrong | 427/190 X |
| 4,448,343 | 5/1984 | Kochka et al. | 228/224 |
| 4,559,436 | 12/1985 | Roach et al. | 228/119 |

FOREIGN PATENT DOCUMENTS

| | | | |
|---|---|---|---|
| 1171322 | 7/1984 | Canada | 228/119 |
| 2513731 | 4/1983 | France | 228/119 |
| 289886 | 5/1969 | U.S.S.R. | 148/26 |
| 0606700 | 5/1978 | U.S.S.R. | 228/223 |

Primary Examiner—Nicholas P. Godici
Assistant Examiner—Karen Skillman

[57] ABSTRACT

A metal brazing sleeve includes a ceramic flux band formed on the sleeve adjacent an annular recess typically disposed near an open end of the sleeve for receiving a conventional braze preform, by adhering a powder flux to the sleeve by a tacky adhesive and then melting the powder flux in place, by internal heating of the tube. The ceramic flux band is hard and adherent, and resistant to abrasion effects during insertion of the sleeve into a tube, and provides a shadow effect for protecting an optional cemented powder flux band which may be formed on the braze ring.

36 Claims, 2 Drawing Sheets

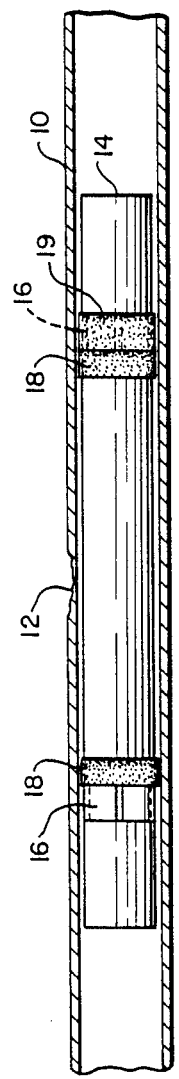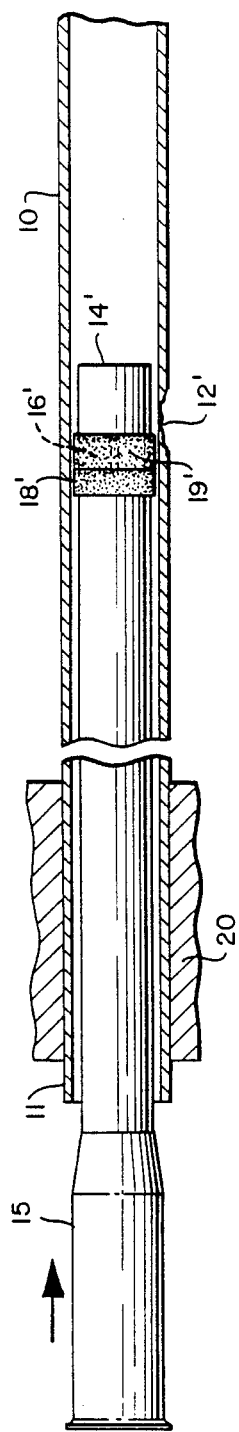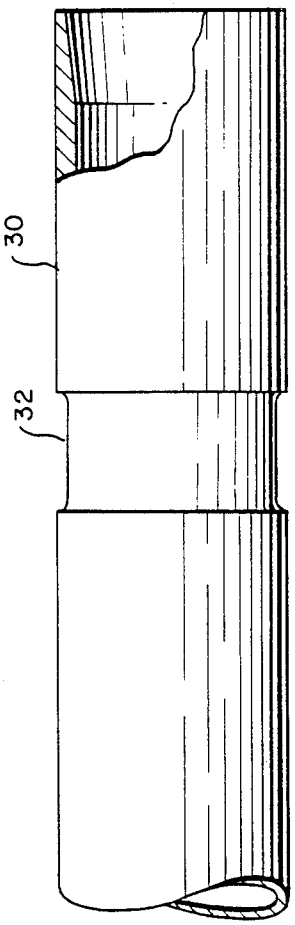

BRAZING SLEEVE HAVING CERAMIC FLUX BAND AND METHOD FOR APPLYING SAME

This is a division of application Ser. No. 06/686,941, filed Dec. 27, 1984, now U.S. Pat. No. 4,624,866, issued Nov. 25, 1986.

BACKGROUND OF THE INVENTION

1. Field of the Invention

This invention relates to a method for applying a flux band on a sleeve to be affixed within a tube by a brazing procedure and, more particularly, for applying a melted-in-place, or ceramic, flux band on such a brazing sleeve which is hard and adherent, and can withstand surface abrasion, and to a brazing sleeve having such a ceramic flux band. The invention has special applicability for performing so-called "sleeving operations" in heat exchangers employed with nuclear reactor power plants, but is of general applicability to any requirement wherein a brazing sleeve must be inserted into and advanced coaxially through a tube for a considerable distance to a remote position at which it is to be brazed in place.

2. Description of the Prior Art

Numerous methods are known in the prior art for preparing a sleeve (i.e., a relatively smaller diameter tube of limited axial length) to be inserted into and advanced coaxially through a relatively larger diameter tube to a remote position at which it is to be brazed to the larger diameter tube, for repairing or sealing defects in the side wall of the larger diameter tube. Such techniques have particularly been developed for repairing the tubes of tube-type heat exchangers, or steam generators, employed with nuclear reactor power plants.

In tube-type heat exchangers, a primary recirculating fluid which is heated by the nuclear reactor flows through the tubes of the heat exchanger while a secondary fluid surrounds the outside of the tubes such that heat exchange occurs between the two fluids, converting the secondary fluid to steam. Occasionally, one of the tubes may develop a defect which can permit a leak to occur, allowing the fluids to mingle. This situation creates not only an ineffective heat exchanger, but also a serious problem of radioactive contamination of the secondary fluid. Therefore, when a leak occurs in a nuclear steam generator heat exchanger tube, the heat exchanger tube must either be plugged or repaired so that the primary fluid does not leak from the tube, and thus to prevent contamination of the secondary fluid.

There are several methods known in the art for repairing heat exchanger tubes; however, many of these methods are not applicable to repair of nuclear reactor heat exchanger tubes. For example, in a nuclear steam generator, the physical inaccessibility of defect regions of heat exchanger tubes and the radioactive nature of the environment surrounding the heat exchanger tubes present unique problems in their repair that do not normally exist in other heat exchangers. For these reasons, special methods have been developed for repairing heat exchanger tubes in nuclear steam generators. Typically, a metal sleeve having an outside diameter slightly smaller than the inside diameter of the defective heat exchanger tube is inserted into the latter and advanced coaxially therewithin to the region of the defect, and then is attached by brazing to the defective tube to bridge, or span, the defect region of the tube. This type of repair method is generally referred to as "sleeving".

U.S. Pat. No. 4,448,343—Kochka et al., issued May 15, 1984 and assigned to Westinghouse Electric Corporation, assignee of the present invention, discloses a "sleeving" method for preparing, inserting and brazing sleeves in nuclear steam generator heat exchanger tubes, which method is capable of being performed where personnel access is limited and a where a leak-proof joint is needed so that no leakage occurs from the tube in the defect region.

Previous sleeving development work has been concerned with obtaining a leakproof joint between the sleeve and the tube by brazing, arc welding, explosive welding, or other metallurgical bonding techniques. The need for cleanliness, close fittings, heat application, and atmospheric control in the environment of nuclear steam generators, however, presents problems in the implementation of these techniques which are not easily solvable.

A particular problem encountered with prior art method arises out of inadequate adherence, to the sleeve, of the flux necessary for the brazing operation. Since alignment of the sleeve with, the inside walls of the tube is not perfect, insertion of the sleeve into the tube can cause abrasion, and thus disruption and removal, of the pre-placed flux, resulting in defective brazed joints. The problem of course is magnified if the sleeve must be inserted a long distance within the tube to the intended brazing position. Prior art techniques, which attempt to solve the adherence problem by placing the flux, underneath the braze alloy, or by cutting a recess in the outer circumference of the sleeve to hold the flux, have successfully protected the flux compound against abrasion; however, the brazed joints formed by these techniques frequently have been of unacceptable quality. The resultant joints thus may not be leakproof, creating a particularly critical problem in the environment of a heat exchanger tube for nuclear powered steam generators, for the reasons above set forth.

SUMMARY OF THE INVENTION

In accordance with the invention, the ceramic flux band is to be applied to one or both ends of a metal sleeve of the type conventionally used in sleeving operations. Typically, the sleeve includes an annular recess adjacent each open end thereof, in which a braze preform, or ring, is inserted. The ceramic flux band of the invention is formed on the portion of the sleeve surface immediately contiguous the edge of the annular recess disposed toward the interior of the tube length and thus the edge of the recess remote from the adjacent, open end of the tube. In one preferred embodiment, after cleaning of the interior and exterior surfaces of the tube, a tacky adhesive is formed on the flux band formation region adjacent the annular recess, and coated with the desired flux material in powder form. The sleeve then is subjected to internal heating so as to melt the flux powder in place, causing same to glaze and form an adherent, hard, ceramic flux band. After suitable cleaning for removing oxides which otherwise would be detrimental to the brazing procedure for which the sleeve is subsequently to be employed, a conventional brazing ring, or pre-form, is mounted in the annular recess. When desired, a powder flux band of conventional type may be formed on the braze ring. The sleeve thus configured to include a ceramic flux band in accordance with the invention has particular usefulness in performing "sleeving" operations in the heat exchange tubes of steam generators employed with nuclear reactor power plants, for sealing a defect in a sidewall of the heat exchange tube. Where the defect is at a remote location, a sleeve is prepared with two sets of ceramic flux bands and associated brazing rings, disposed respectively at opposite ends of the sleeve, the sleeve being inserted into and advanced coaxially through the heat exchange tube to a position such that the opposite ends of the tube span the defect. The sleeve is hydraulically expanded in the region of the respective flux band and brazing ring sets and then internally heated so as to melt the flux band and the brazing ring and produce a brazed joint at each of the sleeve ends, thus sealing off the defect region of the heat exchange tube. Where the defect is adjacent an open end of the heat exchange tube, a sleeve may be prepared with the ceramic flux band of the invention and a brazing ring disposed at one end only, the opposite end of the sleeve preferably being enlarged such that when inserted into the tube from the open end thereof, the enlarged end tightly engages the interior walls of the tube at the open end thereof and the ceramic flux band and associated brazing ring are disposed beyond the position of the defect. The flux band and brazing ring then are internally heated to achieve the brazed joint, as before. The open and accessible end of the sleeve, disposed flush with the open end of the heat exchange tube, then may be further internally expanded and hard rolled to provide a seal; alternatively, following expansion, the enlarged end of the sleeve may be welded to the open end of the tube to achieve the seal. In both applications of the invention, the ceramic flux band is strongly adherent to the sleeve surface and the hard exposed surface thereof is highly resistant to abrasion effects which normally are experienced while transporting the sleeve through the interior of the heat exchange tube. As contrasted with prior art cemented, or powder flux band techniques which are susceptible to abrasion and loss of the flux material during insertion, resulting in imperfect brazed joints, the ceramic flux band of the invention remains intact and undisturbed, assuring the formation of a satisfactory brazed joint. In fact, the brazing can be enhanced by the use of a conventional powder flux band formed as a coating on the braze ring, as above noted, since the ceramic flux band provides a "shadow" effect serving to protect the powder flux band from being abraded during insertion of the sleeve and thus assuring the continued integrity and continuity of the powder flux band as well.

BRIEF DESCRIPTION OF THE DRAWINGS

FIG. 1 is a cross-sectional view of a portion of a heat exchange tube having a defect therein at a remote position from a free end of the tube, and within which is received a sleeve including ceramic flux bands in accordance with the present invention;

FIG. 2 is a cross-section of a portion of a heat exchange tube including an open end thereof and a related tube sheet, into which is partially inserted a sleeve incorporating a ceramic flux band and brazing ring in accordance with an alternative embodiment of the invention;

FIG. 3 is a partially broken away and partially cross-sectional view of one end of a sleeve on which a ceramic flux band in accordance with the invention is to be formed;

DESCRIPTION OF THE PREFERRED EMBODIMENTS

Figure 4:
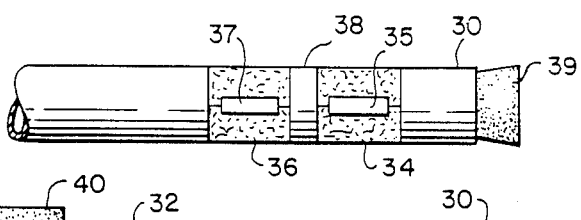
FIG. 4 illustrates the sleeve of FIG. 3, masked in preparation for the formation thereon of a ceramic flux band in accordance with the invention.
Figure 5:
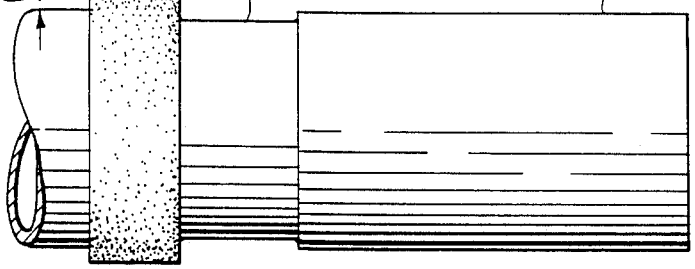
FIGS. 5 and 6 illustrate the sleeve of FIG. 3 in successive, intermediate and final stages of the formation thereon of a ceramic flux band in accordance with the invention.

Nuclear steam generators, as are illustratively disclosed in U.S. Pat. Nos. 4,079,701—Hickman et al. and 4,276,856—Dent et al., assigned to the common assignee herein, employ a plurality of heat exchanger tubes which typically are of inverted U-shape and are supported by being received through suitable apertures in tube sheets positioned adjacent the top and bottom extremities of the straight, vertical leg portions of each U-shaped tube. FIG. 1 illustrates a segment of a heat exchanger tube 10 having a defect 12 in a side wall thereof, which is spanned by a sleeve 14 prepared in accordance with the invention. Opposite extremities of the sleeve 14 have formed thereon corresponding braze rings 16 which are received in annular grooves, or reservoirs, formed in the surface of the tube 10 such that the surface of the braze ring 16 is flush with the surface of tube 10, and melted-in-place flux bands 18 which comprise cemented powder flux which has been converted by heating to a hard, adherent ceramic, or glaze, in accordance with the invention. The braze rings may be of Inconel steel, a composition of 82% gold and 18% nickel, such as are conventionally used in sleeving operations. If desired, the braze rings 16 additionally may be coated with a powder flux band 19 adhered thereto by a suitable acrylic cement. As shown, the ceramic flux bands 18 are disposed interiorly of the braze rings 16 relative to the axial length of sleeve 14 and thus the latter are adjacent the free ends of sleeve 14. In the case of FIG. 1, the segment of tube 10 there illustrated could be located at any position along the straight-leg sections of a conventional U-shaped heat exchange tube, it being understood that the sleeve 14 has been inserted to the extent required to span the defect 12, with the respective sets of brazing rings 16 and related flux bands 18 disposed on either side of the defect. After positioning, the sleeve is internally expanded in the regions of the related sets of ceramic flux bands 18 and braze rings 16, preferably simultaneously, to provide a tight mechanical joint, or interface, between the regions of the sleeve at which the brazed joint will be formed and the corresponding regions of the interior wall of the tube 10. The expansion step may be performed by the hydraulic tool described in the above-referenced U.S. Pat. No. 4,448,343—Kochka et al., incorporated herein by reference. Thereafter, an internal heater element is inserted within the sleeve 14 to melt each of the braze rings 16 and adjacent flux bands 18 and form corresponding braze joints which thus seal the opposite ends of the sleeve 14 to the respective, contiguous areas of the interior walls of tube 10. A suitable heater element is also disclosed in the Kochka et al. U.S. Pat. No. 4,448,343. Preferably, the braze joints are formed in separate succession. As is well known, the material of each braze ring 16 flows by capillary action into the tight interface region generally between the ceramic flux band 18 and the contiguous interior wall areas of tube 10, typically extending axially in an interior direction, i.e., toward the central portion of tube 10. The braze joints thus are formed interiorly of the grooves, or reservoirs, in the sleeve 14 in which the braze rings 16 were previously held. The sleeve 14 thus seals off the defect 12 and prevents potential leakage from tube 10 through defect 12.

FIG. 2 illustrates an alternative form of the invention wherein elements corresponding to those of FIG. 1 are identified by identical but primed numerals. Particularly, the sleeve 14' again includes a braze ring 16' and a flux band 18' adjacent the interior end of the tube 14'; the opposite end portion 15 of sleeve 14', however, is of increased diameter relative to that the remainder of sleeve 14'. The sleeve 14' in FIG. 2 is shown in a partially inserted position; it will be appreciated that, by further insertion of the tube 14', the enlarged diameter end portion 15 will be received within the tube 11 and brought substantially flush with the free end 11 of the tube 10. When the sleeve 14' is inserted to its final position, the braze ring 16' and flux band 18' are disposed beyond the region of defect 12'. In this instance, the enlarged end 15 is accessible at the free end 11 of the tube 10 such that it may conveniently be welded to same or mechanically joined, by hydraulic expansion and hard rolling, to complete the seal. The increased diameter of end 15 affords an initial, tight mechanical fit and thus minimizes the extent of further deformation produced in the hydraulic expansion step. Internal expansion and heating steps, as above described, then are required only for completing the braze joint to be formed by the braze ring 16' and flux band 18'. As will be explained, the sleeve 14' may also include a powder flux band 19' adhered to the surface of braze ring 16'.

It is to be understood that the benefits of the melted-in-place flux procedure in accordance with the invention are achieved in both illustrative applications of FIGS. 1 and 2, and particularly that the improved adherence and durability of the ceramic flux band formed in accordance with the process of the invention overcome the problem of abrasive removal of the flux material as may readily occur with a prior art powder flux band during the insertion and positioning operations.

When it is necessary to repair the tube 10 having the illustrative defect 12, the nuclear steam generator is drained of its primary fluid, or coolant, and deactivated so that one end of a tube 10 can be reached by either remote access manipulators or by working personnel. Tube 10 is then cleaned to remove the internal oxide layer therefrom. The cleaning process may be performed by the process described in the above-noted Kochka et al. U.S. Pat. No. 4,448,344, incorporated herein by reference. When the interior of tube 10 has been properly prepared, the sleeve, such as 14 or 14', is inserted to the position required, internally expanded and then heated to form the braze joints, as above-described.

The process for forming the melted-in-place, or ceramic, flux bands of the invention is described with reference to FIGS. 3 to 8, which illustrate only a remote or innermost portion of the sleeve 30 on which a braze ring and the ceramic flux band of the invention are to be formed; the opposite end of the sleeve 30 may be of either of the forms of FIGS. 1 or 2. With reference to FIG. 3, the sleeve 30 includes an annular recess 32 approximately one inch from the end of the tube 30; where the normal outside diameter (O.D.) of tube 30 is approximately 0.74 inches and the internal dimension (I.D.) of tube 30 is approximately 0.66 inches, the recess 32 may have a radial depth of approximately 0.016 inches and an axial length of approximately 0.36 inches. Preferably, the interior of the free end of tube 30 is tapered outwardly over a distance of approximately ¼ inch from the normal I.D. of sleeve 30 to an enlarged I.D., reducing the side wall thickness to approximately ½ of the normal side wall thickness of tube 30, while maintaining a uniform O.D. The taper affords a smooth transition to electrical signals, relative to use of an eddy current transistor probe.

In practicing the process of the invention, as hereafter described, various specific materials and equipment are required; these are now first defined. The flux material in one preferred embodiment of the invention is lithium tetraborate ($Li_2B_4O_7$), in powder form of less than 100 mesh, reagent grade, available from Cerac Corporation. An acrylic spray described hereinafter may be Acrylic-Krylon brand No. 1301. Cleaning solvents should be reagent grade, such as are available from Fisher Scientific Company including toluene (T-324), acetone (A-18) and ethyl alcohol (A-962). A wetted wipe operation is performed with Kim-Wipe tissue available from Kimberly Clark Corporation. Routine commercially available materials include argon gas of welding grade, helium gas, and Nicrobraze metal powder, 60 mesh, used in various shot blast operations hereinafter described. Masking may be performed with Kraft paper purchased as MS-0607 Kraft paper from Westinghouse Printing, Traford, Pa. A polyethylene sleeve employed in the process may be commercial grade polyethylene of 0.003" thickness. A fluidized bed of flux powder may be provided employing commercially available equipment such as a Garber Model D Vibro-fluidizer manufactured by Garber Mfg. Co. of Warsaw, Ind.

Performance of the process in accordance with the following steps has successfully produced ceramic flux bands of strong adherence and high abrasion resistant qualities, which have been employed successfully in providing leakproof brazed joints for sleeving operations as above described. With reference to the illustrative sleeve 30 of FIG. 3, the steps are as follows:

1. Clean the outside surface (OD) of sleeve 30 with acetone wetted wipe.

2. Bead blast the surface of sleeve 30 on each area to receive a flux band and braze ring set, typically by bead blasting a 1½ inch wide band (as measured along the axis of tube 30) centered on the annular recess 32, using Nicrobraze metal powder.

3. Clean both the exterior surface and interior surface of sleeve 30 using an acetone wetted wipe and a cloth gun cleaner and thereafter clean again, using an alcohol wetted wipe and a cloth gun cleaner.

4. As illustrated in FIG. 4, mask the surface of tube 30 to define and leave exposed the circumferential area, or location 38, on which the flux band is to be formed, using a single-thickness layer of Kraft paper, as shown at 34 and 36, securing same in place with masking tape as shown at 35 and 37, respectively. A cork 39 then is inserted in each end of the sleeve 30 to avoid any significant contamination, including particulate matter, from collecting within the sleeve 30 in subsequent processing steps.

5. Heat sleeve 30 in an oven in accordance with the following temperature guidelines:

| Room Temp. °C. | Oven Temp. °C. |
| --- | --- |
| 18–20 | 40–35 |
| 20–22 | 35–32 |
| 22–25 | 32–30 |

Typically, heating should be performed for approximately 30 minutes.

6. Remove sleeve 30 from oven and within five seconds spray one end with Krylon 1301 and permit to dry in air at room temperature, from one to three seconds, until the surface becomes tacky.

7. Prepare a fluidized bed of lithium tetroborate flux powder. Typically, the container may employ from one to two kilograms of the powder, and compressed air is supplied to a pneumatic vibrator to start vibration of the container. Argon gas, regulated at 20 psig, then is caused to flow through the fluidized bed at a rate of from 30–40 SCFM to achieve an agitated bed of powder. The powder temperature should be maintained at less than 25° C.

Insert the sleeve 30 vertically into the fluidized bed of flux powder, maintaining same therein for a period of from three to five seconds, and thereafter withdraw sleeve 30 from the fluidized bed and tap lightly to remove excess flux.

Quickly repeat the insertion and withdrawal of the sleeve 30 from the fluidized bed to produce a multiple coat of powder flux of sufficient thickness to satisfy the ultimate, required thickess of the glazed, or ceramic, flux band. Since the glazed flux thickness shrinks to approximately ¼ the powder thickness, the composite thickness of the multiple-layer coating of powder flux should be approximately at least 0.012 inches, such that a final thickness of the ceramic flux band of 0.003 will be achieved. The sleeve 30 thus appears as in FIG. 5, with a flux powder band 40 adjacent the annular recess 32.

7.A. If sleeve 30 requires a flux band at its opposite end as in FIG. 1, repeat steps 5, 6 and 7 for the opposite end, having first suitably masked the opposite end in accordance with step 4 above.

8. Remove the Kraft paper masks 34 and 36 and clean sleeve 30 of excess powder on the exterior surface by wiping with alcohol-wetted Kim-Wipe and thereafter wipe the interior of sleeve 30 with alcohol wetted gun cleaner rod.

Figure 6:
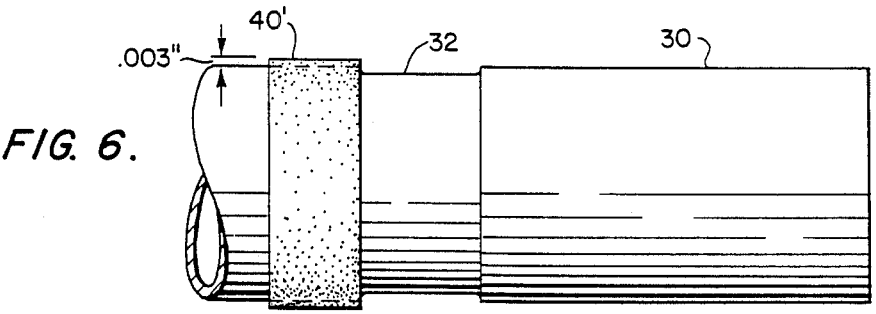

9. Heat the powder flux band to a temperature of from 1625° to 1675° F., thereby to completely fuse or glaze the powder. Whereas the heating step may be performed using the heater employed in forming the braze joints, as above described, a preferred form of heater is disclosed in U.S. application Ser. No. 571,241 filed Jan. 16, 1984 in the name of J. M. Driggers, et al. and entitled "SMALL DIAMETER RADIANT TUBE HEATER", assigned to the common assignee herein. In use of the platinum radiant tube heater of that application, welding grade helium is supplied into the base thereof, at between five to ten CFH. The power input to the heater should be sufficient to obtain melting within 1.5 minutes. The temperature of the powder flux band 40 may be monitored by an optical pyrometer focused at the center of the flux band 40. Typically from 85 seconds to 100 seconds are required to achieve the fusing temperature, which time period varies, depending upon the heater temperature and other variables. The sleeve 30 then is cooled by convection cooling in room temperature air to a temperature of less than 200° F. At this stage, the ceramic flux band 40' is formed on sleeve 30, as seen in FIG. 6.

If a second flux band is required, steps 4 to 9 are repeated. In the alternative, if a heater having properly spaced, dual heating zones is available, two flux bands may be formed simultaneously, in which case both tube ends are treated in each of steps 4 to 9. If only a single flux band is required, the process proceeds to step 10.

10. The flux band 40' then is masked using Kraft paper and the sleeve 30 is shot blast using Nicrobraze 60 as before, over approximately a one inch band adjacent to the edge of the ceramic flux band 40' on the edge thereof remote from the annular recess 32 (and thus to the left thereof as seen in FIG. 6) to remove any oxide from the surface of sleeve 30 adjacent the ceramic flux band 40'. Any remaining oxide should be removed from the surface of sleeve 30 using 180 grit silicon carbide paper, while lathe turning the sleeve 30. It is particularly important that any oxide film on the surface of sleeve 30 adjacent the edge of the ceramic flux band 40' remote from the recess 32 be removed to assure that an oxide-free surface is afforded over the region in which the brazed joint will be formed.

11. The ceramic flux band 40' preferably is again masked as in step 10 (unless the mask of step 10 remains intact) and then the sleeve 30 is shot blast from its free end to a distance of approximately one inch beyond the edge of the ceramic flux band 40' remote from the recess 32, and thus toward the interior of the length of sleeve 30.

12. The outside surface of the sleeve 30 then is cleaned using toluene and acetone and finally an alcohol wipe. The interior surface of the sleeve 30 moreover is cleaned with an alcohol-wetted wipe on a gun cleaner rod.

Figure 7:
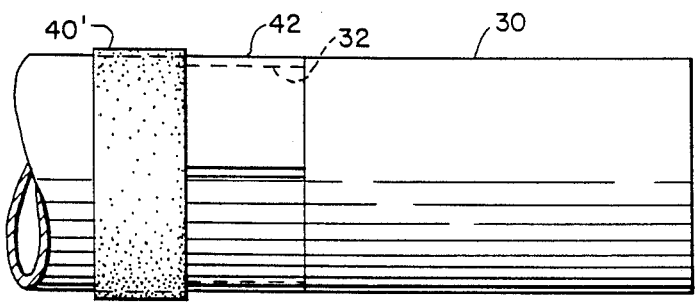
FIG. 7 illustrates the sleeve of FIG. 6 after mounting a braze ring thereon.

13. With reference to FIG. 7, the braze ring 42 is washed in an ultrasonic cleaning bath for a minimum of five minutes and thereafter cleaned in two steps, first using an acetone bath and then an alcohol bath. The braze ring 42 then is inserted into the annular recess 32 in a clean, lint-free environment.

Figure 8:
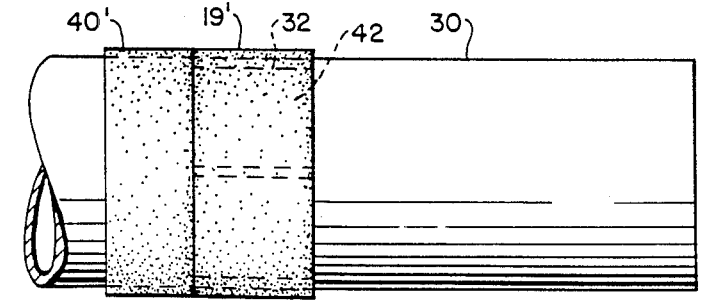
FIG. 8 illustrates the sleeve of FIG. 7 further including a powder flux band formed as a coating on the braze ring seen in FIG. 7.

Following completion of the above steps, the sleeve 30 thus is provided with the braze ring 42 and the ceramic flux band 40', as seen in FIG. 8. After inspection to assure that the process was successful and that a uniform ceramic flux band was successfully accomplished, the sleeve 30 may be packaged such as in a sealed polyethylene bag.

The process of the invention as above described has furthermore been practiced successfully utilizing alternative flux materials, and particularly sodium tetraborate powder ($Na_2B_4O_7$). The powder may be obtained commercially as Fisher Scientific S-252, and should be fused and then ground. The identical process steps 1–13 as set forth above are followed, the sole difference being that the powder flux band formed of sodium tetraborate should be heated to a lower temperature, of 1375° F. to 1425° F., at step 9.

If desired, a powder flux band may be prepared on the surface of the braze ring 16, as shown at 19 in FIG. 1 (or at 19' in FIG. 2). For that purpose, steps 1–8 as above set forth are repeated, the masking however being applied in step 4 so as to expose the surface of the braze ring 42 and thus with the edges of the masking Kraft paper aligned and contiguous with the parallel circumferential edges of the braze ring 42 as seen in FIG. 8. Step 7.A. as well would be applicable, consistent with the circumstances there described.

The following additional steps then are performed:

8'. Seal the powder flux coating by spraying several coats of Krylon 1301 thereon, while rotating the sleeve 30 to assure uniform coverage.

9'. Remove the paper mask and cure the seal-coated flux by heating to 150° for at least 10 minutes.

10'. Inspect the final powder flux band to assure uniform thickness, using an optical comparator; assure adequate adherence, in that the cemented powder flux should not rub off under light manual pressure.

11'. Clean the surface of the sleeve 30, removing excess particulate powder flux after the seal coating operation of step 8' by abrading lightly with silicon carbide emery cloth (320 grit) and carefully wipe the entire surface of the sleeve 30 to remove residual flux powder outside the powder flux band using a three-step cleaning process constituting separate wipes with fresh Kim-Wipes, of:

(A.) toluene wetted Kim-Wipe; remove end corks and immediately follow with:
(B.) acetone wetted Kim-Wipe and
(C.) alcohol wetted Kim-Wipe.

Finally, wipe the interior of the sleeve 30 with an alcohol wetted wipe on a gun cleaner rod, visually inspecting for any traces of flux powder and repeating operation until the interior of the sleeve 30 is clean.

12'. Insert completed sleeve into polyethylene bag and heat seal ends.

A significant aspect of the provision of a conventional powder flux band is that the same can be satisfactorily employed in a sleeve having a ceramic flux bands provided in accordance with the invention. Particularly, the ceramic flux band 40' provided in accordance with the invention is of slightly greater diameter than the tube 30. By contrast, the braze ring 42 is seated within the groove 32 such that its outside diameter is no greater than that of the tube 30. The thickness of the powder flux band 19 formed on the ring 42 may be of the same or greater diameter than the ceramic band 40'. As a result, the ceramic band 40' provides a "shadow" effect, centering the sleeve 30 within a tube, such as the tube 10 shown in FIG. 1, and substantially preventing or at least minimizing the extent of abrasive contact between the powder flux band 19 and the interior walls of the tube 10, thus to avoid or at least minimize the extent of removal of the powder flux band material during insertion of the sleeve. As before noted, a typical thickness of the ceramic flux band is 0.003 of an inch, after the shrinkage which occurs as a result of heating the powder flux as initially applied for glazing same and forming the ceramic band; on the other hand, a powder flux band, cemented in place in the conventional manner, may be the same or greater in thickness, typically 0.004 of an inch or more. The "shadow" effect of the ceramic flux band, however, assures that even though some of the powder flux band may be removed during insertion, the thickness thereof should be reduced to no less than the thickness of the ceramic flux band. Accordingly, in FIG. 8, the powder flux band 19' has been shown as being of the same thickness as the ceramic flux band 40'. The powder flux band enhances the beneficial results obtained, when used in combination with the ceramic flux band of the present invention.

Various alternative procedures and materials, as well as supplemental procedures and materials may be employed, where desired and as may be necessary, for achieving the melted-in-place, ceramic flux band sleeves of the present invention. For example, whereas the foregoing described process is highly suitable for limited quantity production of sleeves in accordance with the invention, higher volume production may be realized by the following alternative application procedures, promising significant cost savings. For example, it has been demonstrated that the sodium tetraborate flux powder may be melted in a plasma flame and blown directly onto a suitably masked area of the sleeve surface, on which it solidifies on contact and produces an enameled surface very similar to the enameled or ceramic glaze achieved by the powder-coating and internal heating technique above described. Other blast melting applications such as flame spraying or shock tube melting may be used in addition to plasma spraying.

I claim as my invention:

1. A brazing sleeve having first and second ends, comprising:
    at least one region adjacent one of said ends for receiving a braze preform thereon; and
    a ceramic flux band formed on said sleeve on a circumferential surface portion thereof contiguous to each braze preform region and disposed interiorally of said, said ceramic flux band being formed by adhering a powder flux material on the circumferential surface portion and heating same sufficiently to melt the powder flux material to form an adherent, hard ceramic flux band.

2. A brazing sleeve as recited in claim 1, further comprising:
    a braze preform received on said one region.

3. A brazing sleeve as recited in claim 2, further comprising:
    a powder flux band cemented on said braze preform.

4. A brazing sleeve as recited in claim 1 wherein said ceramic flux band comprises lithium tetraborate.

5. A brazing sleeve as recited in claim 1 wherein said ceramic flux band comprises sodium tetraborate.

6. A brazing sleeve, comprising:
    an elongated, generally cylindrical metal sleeve having first and second ends and a first annular recess in the surface thereof adjacent said first end; and
    a ceramic flux band formed on said sleeve on a first circumferential surface portion thereof contiguous to said first annular recess and disposed interiorly thereof, said ceramic flux band being formed by adhering a powder flux material on the circumferential surface portion and heating same sufficiently to melt the powder flux material to form an adherent, hard ceramic flux band.

7. A brazing sleeve as recited in claim 6, wherein said first ceramic flux band comprises a flux material, applied in powder form and adhered to said sleeve on said first circumferential surface portion by an acrylic material, the combination of said sleeve, said acrylic material and said flux material powder being heated at a temperature and for a time sufficient to fuse said flux material powder and securely adhere same as said first ceramic flux band on said first circumferential surface portion of said sleeve.

8. A brazing sleeve as recited in claim 7, wherein said flux material powder is of 100 mesh.

9. A brazing sleeve as recited in claim 8, wherein said flux material powder is lithium tetraborate.

10. A brazing sleeve as recited in claim 7, wherein said flux material is sodium tetraborate.

11. A brazing sleeve as recited in claim 6, further comprising a first braze preform received in said first annular recess.

12. A brazing sleeve as recited in claim 11, wherein said first braze preform is of ring-shaped configuration and of a thickness so as to be received in said first annular recess with the outer surface thereof substantially flush with the outer surface of said sleeve.

13. A brazing sleeve as recited in claim 12, further comprising:
a first powder flux band cemented on the surface of said first braze preform.

14. A brazing sleeve as recited in claim 13, wherein said first powder flux band comprises a flux material applied in powder form and adhered to said first braze preform by an acrylic material, the combination of said sleeve, said first braze preform and said powder flux material being heated at a temperature and for a time sufficient to cure the acrylic material and thereby cement the powder flux material as said first powder flux band on the surface of said first braze preform.

15. A brazing sleeve as recited in claim 14, wherein said powder flux material comprises lithium tetraborate.

16. A brazing sleeve as recited in claim 14, wherein said powder flux material comprises sodium tetraborate.

17. A brazing sleeve as recited in claim 13, wherein said first ceramic flux band has an outer diameter sufficiently larger than the outer diameter of said first powder flux band to afford a shadow effect, for protecting said first powder flux band from abrasive removal.

18. A brazing sleeve as recited in claim 6, further comprising:
a second annular recess formed in the surface of said metal sleeve adjacent said second end; and
a second ceramic flux band formed on said sleeve on a second circumferential surface portion thereof contiguous to said second annular recess and disposed interiorly thereof and axially displaced from said first ceramic flux band.

19. A brazing sleeve as recited in claim 18, further comprising a second braze preform received in said second annular recess.

20. A brazing sleeve as recited in claim 6, wherein said second end of said metal sleeve is of an enlarged diameter relative to the remainder of said metal sleeve.

21. A sleeved construction of connected, first and second sealed joints for spanning a defect, comprising:
an elongated metal tube of generally cylindrical interior configuration of a given interior diameter and having an open end and a defect in the sidewall thereof, accessible from the open end thereof;
a brazing sleeve of generally cylindrical configuration having first and second ends and a first annular recess in the outer cylindrical surface thereof adjacent said first end, said sleeve having an outer diameter approximating, but smaller than, the interior diameter of said metal tube throughout at least a substantial portion of its length including said first end thereof;
a first braze preform initially received in said first annular recess of said brazing sleeve;
a first ceramic flux band initially formed on a first circumferential surface portion of said sleeve contiguous to said first annular recess and disposed interiorly thereof, said ceramic flux band being formed by adhering a powder flux material on the circumferential surface portion and heating same sufficiently to melt the powder flux material to form an adherent, hard ceramic flux band;
said brazing sleeve being positioned within said metal tube, by insertion through said open end thereof, to span said defect between said first ceramic flux band and said second end of said sleeve, said first circumferential surface portion of said sleeve being positioned beyond said defect, relative to said open end of said metal tube;
at least said first end of said brazing sleeve being interiorly expanded and then heated to melt said first braze preform and said first ceramic flux band and form a first sealed joint between said first circumferential portion of said sleeve and said tube; and
said second end of said brazing sleeve including means forming a second sealed joint between said sleeve and said tube.

22. A sleeved construction as recited in claim 21, wherein:
said means for forming a second sealed joint comprises an enlarged diameter portion of said sleeve, extending from and including said second end of said sleeve and of substantially the same outer diameter as the inner diameter of said metal tube, mechanically joined at said second end to said open end of said tube to form said second sealed joint therewith.

23. A sleeved construction as recited in claim 22, wherein said second end of said sleeve is welded to said open end of said tube.

24. A sleeve construction as recited in claim 21, wherein said means adjacent said second end of said sleeve comprises:
a second annular recess in the surface of said sleeve adjacent said second end thereof;
a second braze preform initially received in said second annular recess of said sleeve;
a second ceramic flux band initially formed on a second circumferential surface portion of said sleeve contiguous to said second annular recess and disposed interiorly thereof, said ceramic flux band being formed by adhering a powder flux material on the circumferential surface portion and heating same sufficiently to melt the powder flux material to form an adherent, hard ceramic flux band;
said sleeve, intermediate said first and second ceramic flux bands, spanning the defect in the sidewall of said tube; and
said second end of said brazing sleeve being interiorly expanded and heated to melt said second braze preform and said second ceramic flux band and form thereby said second sealed joint between said second circumferential surface portion of said sleeve and said tube.

25. A sleeved construction as recited in claim 24, wherein said ceramic flux band comprises lithium tetraborate.

26. a nuclear reactor system, comprising:
a pressure vessel;
a plurality of heat exchange tubes housed in said pressure vessel, each said heat exchange tube being of metal and having at least one open end and an elongated, generally straight axial portion extending from each such open end and having a sidewall defining a generally cylindrical interior of a given diameter; and a sleeve construction of connected, first and second sealed joints for spanning and bypassing a defect in the sidewall of a given said heat exchange tube located at a position in the straight axial portion of said tube displaced form a given, open end thereof;

a brazing sleeve of generally cylindrical configuration having first and second ends and a first annular recess in the outer cylindrical surface thereof adjacent said first end, said sleeve having an outer diameter approximating, but smaller than, the interior diameter of said metal tube throughout at least a substantial portion of its length including said first end thereof, a first braze preform initially received in said first annular recess of said brazing sleeve, a first ceramic flux band initially formed on a first circumferential surface portion of said sleeve contiguous to said first annular recess and disposed interiorly thereof, said first ceramic flux band being formed by adhering a powder flux material on the circumferential surface portion and heating same sufficiently to melt the powder flux material to form an adherent, hard ceramic flux band, said brazing sleeve being positioned within said metal tube, by insertion through said open end thereof, to span said defect between said first ceramic flux band and said second end of said sleeve, said first circumferential surface portion of said sleeve being positioned beyond said defect, relative to said open end of said metal tube, at least said first end of said brazing sleeve being interiorly expanded and then heated to melt said first brazed preform and said first ceramic flux band and form a first sealed joint between said first circumferential portion of said sleeve and said tube, and said second end of said brazing sleeve including means forming a second sealed joint between said sleeve and said tube.

27. A nuclear reactor system as recited in claim 26, wherein:

said means for forming a second sealed joint coomprises an enlarged diameter portion of said sleeve, extending from and including said second end of said sleeve and of substantially the same outer diameter as the inner diameter of said metal tube, mechanically joined at said second end to said open end of said tube to form said second sealed joint therewith.

28. A nuclear reactor system as recited in claim 27, wherein said second end of said sleeve is welded to said open end of said tube.

29. A nuclear reactor system as recited in claim 27, wherein said means adjacent said second end of said sleeve comprises:

a second annular recess in the surface of said sleeve adjacent said second end thereof;

a second braze preform initially received in said second annular recess of said sleeve;

a second ceramic flux band initially formed on a second circumferential surface portion of said sleeve contiguous to said second annular recess and disposed and remote from said one of said ends;

said sleeve, intermediate said first and second ceramic flux bands, spanning the defect in the sidewall of said tube; and said second end of said brazing sleeve being interiorly expanded and heated to melt said second braze preform and said second ceramic flux band and form thereby said second sealed joint between said second circumferential surface portion of said sleeve and said tube.

30. A nuclear reactor system as recited in claim 27, wherein said means adjacent said second end of said sleeve comprises:

a second annular recess in the surface of said sleeve adjacent said second end thereof;

a second braze preform initially received in said second annular recess of said sleeve;

a second ceramic flux band initially formed on a second circumferential surface portion of said sleeve contiguous to said second annular recess and disposed interiorly thereof, said second ceramic flux band being formed by adhering a powder flux material on the circumferential surface portion and heating same sufficiently to melt the powder flux material to form an adherent, hard ceramic flux band;

said sleeve, intermediate said first and second ceramic flux bands, spanning the defect in the sidewall of said tube; and said second end of said brazing sleeve being interiorly expanded and heated to melt said second braze preform and said second ceramic flux band and form thereby said second sealed joint between said second circumferential surface portion of said sleeve and said tube.

31. A nuclear reactor system as recited in claim 26 wherein said ceramic flux band comprises sodium tetraborate.

32. A sleeved construction as recited in claim 24, wherein said ceramic flux band comprises sodium tetraborate.

33. A brazing sleeve as recited in claim 1 wherein said ceramic flux band is formed by cleaning the circumferential surface portion of the sleeve, forming a tacky adhesive coating on the cleaned portion thereby to adhere the powder flux material on the cleaned portion, and then heating at least the cleaned portion of the sleeve and the powder flux material adhered thereon sufficiently to completely fuse the powder flux and thereby form the ceramic flux band.

34. A brazing sleeve as recited in claim 6, wherein said ceramic flux band is formed by cleaning the circumferential surface portion of the sleeve, forming a tacky adhesive coating on the cleaned portion thereby to adhere the powder flux material on the cleaned portion, and then heating at least the cleaned portion of the sleeve and the powder flux material adhered thereon sufficiently to completely fuse the powder flux and thereby form the ceramic flux band.

35. A brazing sleeve as recited in claim 21, wherein said ceramic flux band is formed by cleaning the circumferential surface portion of the sleeve, forming a tacky adhesive coating on the cleaned portion thereby to adhere the powder flux material on the cleaned portion, and then heating at least the cleaned portion of the sleeve and the powder flux material adhered thereon sufficiently to completely fuse the powder flux and thereby form the ceramic flux band.

36. A brazing sleeve as recited in claim 26, wherein said ceramic flux band is formed by cleaning the circumferential surface portion of the sleeve, forming a tacky adhesive coating on the cleaned portion thereby to adhere the powder flux material on the cleaned portion, and then heating at least the cleaned portion of the sleeve and the powder flux material adhered thereon sufficiently to completely fuse the powder flux and thereby form the ceramic flux band.

* * * * *